United States Patent [19]

Bernard

[11] 4,059,442

[45] Nov. 22, 1977

[54] METHOD FOR MAKING A POROUS TANTALUM PELLET

[75] Inventor: Walter J. Bernard, Williamstown, Mass.

[73] Assignee: Sprague Electric Company, North Adams, Mass.

[21] Appl. No.: 713,012

[22] Filed: Aug. 9, 1976

[51] Int. Cl.$^2$ .............................. B22F 1/00; B22F 7/04
[52] U.S. Cl. ................................... 75/208 R; 75/211; 75/214; 148/126
[58] Field of Search ..................... 75/211, 214, 208 R; 148/126

[56] References Cited

U.S. PATENT DOCUMENTS

| | | | |
|---|---|---|---|
| 3,299,326 | 1/1967 | Gluyas et al. | 317/230 |
| 3,430,108 | 2/1969 | Daedliker | 317/230 |
| 3,496,425 | 2/1970 | Kirkpatrick et al. | 317/230 |
| 3,697,255 | 10/1972 | Baldwin et al. | 75/.5 AB |
| 3,843,360 | 10/1974 | Hanaoka et al. | 75/222 |

*Primary Examiner*—Richard E. Schafer
*Attorney, Agent, or Firm*—Connolly and Hutz

[57] ABSTRACT

A quantity of tantalum powder is heated to a temperature greater than 400° C in a non-oxidizing atmosphere to dissolve the tantalum oxide film existing on the surfaces of the tantalum particles. The treated powder without conventional organic binders is compressed to form a unitary pellet in a mold maintained in an inert atmosphere. The pellet is subsequently heated in a vacuum to sinter the particles together and to provide a porous tantalum pellet having carbon-free tantalum surfaces and a large exposed surface area per unit weight of tantalum. Electrolytic capacitors made from these pellets exhibit a larger CV product per unit weight of tantalum and/or a lower leakage current than for comparable capacitors known heretofore.

17 Claims, No Drawings

METHOD FOR MAKING A POROUS TANTALUM PELLET

BACKGROUND OF THE INVENTION

This invention relates to a method for making porous tantalum pellets, and more particularly to the production of such pellets for use in electrolytic capacitors.

The usual method for making porous tantalum pellets includes coating tantalum powder particles with an organic binder medium, dispensing the coated powder into a mold-press cavity, compressing the powder to produce a pellet, heating the pellet under vacuum to remove the organic binder, and vacuum sintering the pellet.

The tantalum powder, as initially received, has a thin tantalum oxide film over the surfaces of all the particles, which film tends to inhibit cohesion between the particles upon pelleting, thus making it necessary to use a binder. However the organic binder coating after heat sintering leaves a residue of carbon on the particle surfaces even after the above noted heating and sintering steps, which carbon residue tends to increase the leakage currents of an electrolytic capacitor made from such conventional tantalum pellets.

Although it is known to form compacts of tantalum powder without a binder, the green strength of such unsupported compacts or pellets is generally weak and difficult to handle without breakage during subsequent manufacturing steps.

It is therefore an object of this invention to overcome the above mentioned shortcomings of the prior art.

It is a further object of this invention to provide a porous tantalum pellet having essentially no carbon residue on the tantalum surfaces thereof.

It is a further object of this invention to provide a porous tantalum pellet having a greater tantalum surface area per unit weight of tantalum than heretofore.

SUMMARY OF THE INVENTION

This invention recognizes the principle that compacted tantalum particles having oxide-free surfaces will bond to each other without conventional adhesive binders and can thus be sintered to each other at temperatures lower than would normally be required for sintering compacted conventional oxide-coated tantalum particles containing a binder amd producing porous sintered pellets having no carbon residue.

Conventional tantalum powder particles being exposed to air develop a thin oxide film over all their surfaces. The method of this invention comprises heating a quantity of conventional oxide-coated tantalum powder particles to a temperature greater than 400° C in a non-oxidizing atmosphere to dissolve the surface oxide into the bulk of each tantalum particle and to disperse it away from the particle surface. This occurs because the oxygen atoms become mobile in tantalum oxide at elevated temperatures and are thus able to diffuse toward a region of lower oxygen content. The treated powder is subsequently dispensed into a molding press cavity, preferably while being surrounded by an inert non-oxygen atmosphere. Subsequent steps include compressing the treated powder to form a porous tantalum pellet, and vacuum firing the pellet to sinter the compressed particles to each other. A tantalum anode lead wire is often attached to the pellet by inserting an end of the wire in the compact during pressing.

A practical range of powder treatment temperatures is from 700° C to 1200° C with a corresponding treatment period of about from 2 hours to 30 minutes. At higher temperatures, shorter times are required but more heating energy is required, more expensive furnaces are needed and a point of diminishing returns is reached whereby the total time to raise the temperature, hold it at treatment value, and cool to 200° C no longer becomes significantly shorter. Temperature below 650° C are found to be less effective in removing the oxide film from the particle surfaces and at these lower temperatures the treatment time must be inconveniently extended to more than 2 hours. However, it is possible to use a treatment temperature as low as 400° C.

This novel heat treatment process, in combination with the pellet making steps, provides a porous tantalum pellet having improved properties for use in electrolytic capacitors. At a given voltage rating, a substantially larger capacitance per unit weight of tantalum is obtained. On the other hand, for a given capacitance and voltage rating, a substantially lower leakage current is obtained. The first noted advantage stems from the lower powder compacting pressures required and thus the larger pellet pores obtained using the heat treated powder. The second noted advantage is a direct result of the greater purity of the heat treated tantalum powder and more particularly the near total absence of carbon on the surfaces of the tantalum particles. It will also be seen that less tantalum is required to make a capacitor of any given volt-microfarads rating. Also the use of lower sintering temperatures results in substantially reduced energy requirements for sintering and may lead to the use of lower cost sintering furnaces.

DESCRIPTION OF THE PREFERRED EMBODIMENTS

A tantalum vessel containing a quantity of commercial tantalum powder having an average particle size of 10 microns was placed into a quartz tube and evacuated. The tube containing the tantalum powder was placed in a furnace and heated to a temperature of 900° C for 1 hour. After the powder had cooled to about 200° C (or lower), the vacuum was broken by admitting argon into the tube by means of a valve therein to provide an equalizing one atmosphere of pressure. The tube was re-sealed to maintain the protective argon atmosphere.

A standard tantalum-pelleting press was adjusted to provide pellets (group B) having a density of 8.5 grams/cc. using the aforesaid commercial tantalum powder as received. When pellets (group C) of the vacuum heat treated powder were made in the same press and adjustments made to provide the same green strength as for those of the pellets of Group B, these pellet densities were surprisingly much lower, namely about 7.6 grams/cc.

Another group of pellets (group A) were made in the conventional manner by mixing an organic binder with the commercial tantalum powder as received, after which pellets were pressed. The group A and C pellets were vacuum-sintered in a conventional manner at 2100° C and 1700° C, respectively. Sintered pellets from groups A and C were subsequently "formed" by submersing them in a liquid electrolyte and applying +200 volt d.c. to each pellet anode with respect to an electrode inserted in the electrolyte. This conventional electrolytic forming step provides a thin tantalum oxide film over all exposed surfaces of the porous tantalum pellet. The oxide film serves as the dielectric material between the tantalum pellet as the anode and an electrolyte introduced about and into the pores of the formed pellet as the cathode of a completed electrolytic capacitor.

By resubmersing the pellets, after forming, in a wet electrolyte, the capacitor characteristics were determined by a standard wet-check test measuring between anode and the electrolyte. The average characteristics for the group C pellets were 5.40 microfarads and leakage current at 140 v.d.c. of 4.5 microamps. These group C anodes had a weight of 0.300 grams giving a CV product of 3600 volt microfarads per gram. This CV product was 1.7 times greater than the nominal value of 2100 for the group A units made by the conventional process.

Solid electrolyte capacitors were also made from these pellets by anodizing to 80 volts and operating at 20 volts. The same good properties were reflected in these finished capacitors which had a CV product of 3650 volt-microfarads per gram and a leakage current of only 0.4 micro-amperes after a 1000 hour life test, a value which is well within the limits expected of high quality devices.

Another group of pellets was made using the same procedure and the same materials as for the pellets of group C described above, except that instead of using argon, nitrogen was used as the inert gas providing the protective atmosphere. The results were the same and indistinguishable from those obtained in the above noted standard wet check tests for group C pellets.

The improvement of pellet green strength by the use of heat-treated powder was also demonstrated by an experiment in which several groups of pellets were prepared from a tantalum powder having particles with an average diameter of about 4 microns. Heat-treated powder without an organic binder was pressed to three different densities, and the non-treated powder was used to make a comparative group of pellets, also without a binder. The relative strengths of the pellets were measured by their ability to survive a 15 inch drop on to a stone laboratory bench. The Table below shows the superiority of the pellets made of the heat-treated powder which is attributed to a cold welding of the particles of the latter at pressing.

TABLE

| POWDER | GREEN DENSITY | #SURVIVED |
|---|---|---|
| | (gms/cc) | |
| Nontreated | 7.7 | 2 out of 8 |
| Treated | 7.9 | 8 out of 8 |
| " | 7.7 | 8 out of 8 |
| " | 7.3 | 4 out of 8 |

The above noted drop test used to obtain a qualitative measure of pellet strength is more severe than necessary to provide pellets having adequate strength for use in manufacturing. Also the particular strength of pellets is a function of other factors such as powder particle size. Adequately strong pellets have been made having densities as low as 6.5 gms./cc. Useful pellets of this invention may also have densities as high as 11 gms./c.c.

In the above described example for group C pellets, an inert gas, namely nitrogen, was flooded over the vacuum treated powder during the dipensing of the powder from the glass tube into the press cavity and during the pressing. In a further experiment the protective gas was omitted during dispensing and filling the press cavity and during pressing. It was found that even within a few minutes of exposure of the treated powder to air prior to pressing, that the pressed pellets were too fragile to be useful. Therefore, although it may be possible to automate or otherwise speed up the dispensing of the powder from the protective atmosphere of the container or tube into the press cavity and achieve a much briefer exposure to air prior to pressing, it is preferred to provide the inert gas atmosphere during both of these operations.

Other inert gasses such as carbon dioxide and argon are also suitable for providing a protective atmosphere during storage of the treated powder and during the dispensing and pressing steps. Also an inert gas such as helium or argon may also provide the required non-oxidizing atmosphere during the heat treating of the tantalum pellet instead of a vacuum. However, nitrogen and carbon dioxide are not suitable for use as the inert gasses during the heat treatment step since they react with tantalum at high temperatures.

The vacuum at heat treating is preferably less than $10^{-4}$ torr which would be equivalent to a partial oxygen pressure of less than $2 \times 10^{-5}$ torr of oxygen. The latter is a convenient measure when using inert gas protective atmospheres during heat treating.

Furthermore, it has additionally been found advantageous to direct a blast of the inert gas into the mold cavity prior to dispensing the treated powder therein to blow away any particles of tantalum that may be adhering to the walls of the cavity from the previous pressing cycle.

The treated powder tends to stick to the cavity and/or to the ram of the press more readily than untreated powder, and in a related manner the treated powder pellet is more prone to bind in the cavity during ejection therefrom. The application of a volatile organic lubricant to the cavity walls and/or to the ram prior to each pressing cycle makes this binding less likely. This volatile solvent must leave no residue to undergo decomposition during subsequent sintering. For example, trichloroethylene works well and other such solvents, especially those having a boiling point of from about 80° C to 110° C are also suitable. More volatile solvents such as acetone evaporate too rapidly to provide effective lubrication.

However, these precautions are not necessary when a split mold cavity is employed. In this case, no lubricant is necessary and the open cavity may be blown out as before or simply brushed free of any powder particles that may have stuck to the walls.

The required sintering temperature in general was found to be lower for pellets having been made from heat-treated tantalum particles than for conventional pellets. Conventional pellets are sintered in the temperature range of from 1650° C to 2100° C whereas treated powder pellets of this invention have a sintering temperature range of about 1550° C to 1800° C. The most important reason for this difference is the fact that conventional pellets contain a carbon residue left from the burning out of the organic binder medium, whereas the treated powder pellets do not contain such a carbon residue. This leads to a more intimate and more readily sinterable interface between adjacent particles, less loss of tantalum surface area in the pores of the treated powder pellets and a correspondingly larger capacitance per unit pellet weight. Thus, less tantalum is required to make any particular capacitor.

What is claimed is:

1. A method for making a porous tantalum pellet comprising the sequential steps of:

a. heating a quantity of tantalum powder particles having a surface oxide to a temperature greater than 400° C and no greater than 1200° C in a non-oxidizing atmosphere to dissolve said surface oxide into the bulk of said particles;
b. dispensing said powder into a molding press cavity;
c. providing a protective atmosphere for said powder from said heating through said dispensing;
d. compressing said powder in said cavity to provide a porous tantalum pellet; and
e. vacuum firing said pellet to sinter said compressed particles to each other.

2. The method of claim 1 wherein said firing is accomplished at a temperature of between 1550° C and 1800° C.

3. The method of claim 1 wherein said heating is for about from 30 minutes to 2 hours and said heating temperature is from 1200° C to 700° C.

4. The method of claim 1 wherein said non-oxidizing atmosphere is a vacuum of less than $10^{-4}$ torr.

5. The method of claim 1 wherein said non-oxidizing atmosphere is comprised of an inert gas selected from helium and argon.

6. The method of claim 1 wherein said non-oxidizing atmosphere contains less than $2 \times 10^{-5}$ torr of oxygen.

7. The method of claim 1 further comprising the step of directing a blast of non-oxidizing gas into said cavity prior to said dispensing, for the purpose of blowing away any particles of tantalum that may be adhering to the walls of said cavity.

8. The method of claim 1 further comprising the step of applying a lubricant to the walls of said press cavity prior to said compressing.

9. The method of claim 8 wherein said lubricant is an organic solvent having a boiling point of from 80° C to 110° C.

10. The method of claim 8 wherein said lubricant is trichloroethylene.

11. The method of claim 1 further comprising adjusting said pressing force until said pellet has a density of from 6.5 to 11 grams per cubic centimeter.

12. The method of claim 1 further comprising partially inserting a tantalum wire into said cavity prior to said compressing such that after said compressing, a portion of said wire is embedded in said pellet.

13. The method of claim 1 wherein said molding press cavity is a split cavity type.

14. The method of claim 1 wherein said providing a protective atmosphere is accomplished in part by flooding said powder with an inert gas during said dispensing.

15. The method of claim 14 wherein said inert gas is selected from helium, argon, nitrogen and carbon dioxide.

16. The method of claim 1 wherein said particles are cold-welded during said compressing.

17. The method of claim 1 wherein said providing a protective atmosphere is accomplished in part by surrounding said powder with an inert gas from said heating to said dispensing.